United States Patent [19]

Heimann et al.

[11] Patent Number: 4,680,084

[45] Date of Patent: Jul. 14, 1987

[54] INTERFEROMETRIC METHODS AND APPARATUS FOR DEVICE FABRICATION

[75] Inventors: Peter A. Heimann, Clifton; Joseph M. Moran, Berkeley Heights; Ronald J. Schutz, Warren, all of N.J.

[73] Assignee: American Telephone and Telegraph Company, AT&T Bell Laboratories, Murray Hill, N.J.

[21] Appl. No.: 642,931

[22] Filed: Aug. 21, 1984

[51] Int. Cl.$^4$ .................. H01L 21/306; B44C 1/22; C03C 15/00; C03C 25/06
[52] U.S. Cl. ................... 156/626; 156/643; 156/646; 156/653; 156/655; 156/657; 156/661.1; 156/668; 156/904; 156/345; 156/662; 204/192.34; 204/298; 356/382; 356/445
[58] Field of Search ........... 156/626, 627, 643, 646, 156/653, 655, 657, 659.1, 661.1, 662, 345, 668, 904; 204/192 EC, 192 E, 298; 356/381, 382, 445, 447

[56] References Cited

U.S. PATENT DOCUMENTS 4,454,001 6/1984 Sternheim et al. ............... 156/626
4,482,424 11/1984 Katzir et al. ..................... 156/626

Primary Examiner—William A. Powell
Attorney, Agent, or Firm—Bernard Tiegerman

[57] ABSTRACT

The invention involves new etch monitoring and thickness measurement techniques which are more accurate than previous techniques. In accordance with the invention, the etch depth of a substrate region undergoing etching is monitored, or the thickness of the region is measured, by impinging the region with light and detecting the intensity of the reflected light. In contrast to the previous techniques, the incident light is chosen so that a substrate region underlying, and/or a patterned substrate region overlying the substrate region of interest is substantially opaque to the incident light, which precludes the formation of signals unrelated to etch depth or thickness.

15 Claims, 7 Drawing Figures

INTERFEROMETRIC METHODS AND APPARATUS FOR DEVICE FABRICATION

BACKGROUND OF THE INVENTION

1. Field of the Invention

The invention pertains generally to etching and, more particularly, to etching as practiced in the manufacture of information processing devices.

2. Art Background

The fabrication of devices such as information processing devices, e.g., integrated circuit devices, magnetic bubble devices, and integrated optics devices, involves etching patterns into regions, e.g., layers, of substrate material of different composition which are either incorporated into the device undergoing fabrication or removed during the fabrication process. Regions which are removed include, for example, layers of organic polymer resist. Such a resist layer is typically patterned by being exposed to actinic radiation through a mask, and then subjected to either a wet or dry etchant which selectively etches either the exposed or the unexposed portions. Regions which are incorporated into devices include, for example, layers of semiconductor material, metal, and dielectrics, e.g., silicon dioxide. Typically, a pattern is etched or milled into one of these layers by initially forming an etch or milling mask such as a patterned resist, on the layer, and then etching or milling the uncovered portions of the layer with a wet or dry etchant or a milling agent. Hereafter, for the sake of brevity, it is to be understood that the term "etching", as used in relation to materials other than resists, encompasses milling.

An important consideration in these etching procedures is control of etch depth. For example, overetching a layer of resist material (subjecting the layer to an etchant for a longer period of time than is necessary to etch through its thickness) is generally undesirable since this often leads to a loss of linewidth control during pattern replication, e.g., when using the resist as an etch mask. On the other hand, it is, at times, desirable to terminate etching at a desired depth within a homogeneous layer of material, or at the interface between two different layers of material, to be incorporated into a device.

Various techniques have been devised for monitoring etch depth. One of the most widely used (now conventional) etch depth monitoring techniques relies on the transparency to visible light (light having a wavelength ranging from about 400 nm to about 700 nm) of many substrate layers. (Such a layer is transparent to incident visible light if it transmits at least 5 percent of the incident visible light.) In accordance with this technique, visible light from, for example, a laser, e.g., a helium-neon laser (which emits light having a wavelength of 632.8 nm), is directed onto a bare, i.e., uncovered, area of the transparent (to the visible light) layer undergoing etching, and the intensity of the light reflected from the layer is detected and recorded as a function of time. Because the layer is transparent, the incident light is both reflected from the upper surface of the transparent layer and is transmitted, i.e., refracted, through the layer, as shown in FIG. 1. If the layer overlies a reflective surface, then the refracted light is also reflected upwardly through the layer, exiting the layer to interfere with the light reflected from the upper surface of the layer. As etching proceeds, the thickness of, and thus the optical path length through, the substrate layer being etched is reduced. Consequently, at specific thicknesses, destructive or constructive interference, which correspond to, respectively, a relative minimum and relative maximum in the recorded intensity-time curve, occurs. It is possible to relate the time intervals between these intensity extrema to changes in etch depth.

A primary reason for the wide use of the above-described technique is its compatibility with the conventional alignment procedure. That is, fiducial marks in substrates are employed to align resist exposure masks. The resist layer is formed over the substrate and thus commonly over the fiducial mark. The exposure mask is aligned with the fiducial mark by shining visible light (generally the very same wavelength of visible light used for etch monitoring) onto the resist layer (which, because of its transparency to the incident visible light, permits the fiducial mark to be detected). Since the ability to detect fiducial marks with visible light is considered essential, changes in the etch monitoring technique involving increases in the opacity of substrate regions overlying these marks are avoided.

While the conventional etch monitoring technique has many advantages, including compatibility with the conventional alignment technique, difficulties arise when the substrate contains more than one transparent region. For example, if a transparent substrate region undergoing etching is supported by a second transparent region which overlies a nonplanar surface, e.g., a stepped surface, then incident visible light will be refracted through both transparent substrate regions, reflected from the structures in the nonplanar surface, and transmitted upwardly through the two transparent regions. Interactions between light beams which have so been refracted and reflected often produce an unwanted interference signal which, in may cases, is so large that the interference signal from the substrate region undergoing etching is undetectable.

The conventional etch monitoring technique has other difficulties. For example, if the etch rate (of the region being etched) is constant, then the etch end point, i.e., the instant in time when the interface between the transparent substrate region undergoing etching and the underlying region is reached, corresponds to a frequency change of the intensity oscillations in the recorded intensity-time curve. But because this frequency change can, and does, occur at any point along an intensity oscillation (in the intensity-time curve), the etch end point is difficult to anticipate. Moreover, if the thickness of the substrate layer undergoing etching is less than, or is a relatively small multiple of, the etch depth change corresponding to the spacing between adjacent intensity extrema, then there will be less than one intensity oscillation, or a relatively small number of intensity oscillations, corresponding to the substrate region thickness. These two effects often make it difficult to accurately determine etch end point, which often results in undesirable underetching or overetching of the region being etched.

In an alternative etch monitoring technique, applicable to opaque or transparent (to visible light) substrate regions, visible light is directed onto an area of a substrate region (undergoing etching) shielded by a patterned etch mask. The incident visible light is reflected both from the etch mask surface and from the etch pit (or pits) being etched into the substrate region. At specific etch depths, there is either constructive or destructive interference, with consequences similar to those described for the previous procedure.

The alternative etch monitoring technique also has many advantages and is also compatible with the conventional alignment technique (the etch mask is typically transparent to incident visible light). However if the (transparent) etch mask itself undergoes etching during the etching process (as is often the case), then this results in an interference signal (produced by varying interactions between light beams reflected from the top and bottom of the etch mask) unrelated to the etching of the substrate region. This unrelated signal is often much larger than that associated with the etching of the substrate region, which again results in undesirable underetching or overetching.

The etch end point of a substrate region (the point in time when the region has been etched through its thickness) is readily determined if the thickness, and etch rate, of the substrate region are known (for example, if etch rate is constant, then the etch time required to achieve etch end point=thickness/etch rate). Thus, techniques have been devised for measuring the thickness of substrate regions. One such thickness measurement technique, which is widely used because it, too, is compatible with the conventional alignment technique, involves shining visible light onto the (transparent) substrate region whose thickness is to be measured. If the region is known to have a thickness less than $\lambda/4n$, where $\lambda$ is the wavelength of the incident light, and n is the index of refraction of the layer, then the thickness is readily determined from the intensity of the reflected light. (See, for example, O. S. Heavens, *Optical Properties of Thin Films* (Dover Publications, New York, 1965), Section 4.4.) Alternatively, the thickness is determined by shining visible light of different wavelengths onto the region (whose thickness is being measured), and measuring the intensity of the reflected light for each wavelength. At specific wavelengths, interference phenomena occur through the previously described mechanisms. The thickness of the substrate region is readily calculated from the observed intensity extrema as shown in, for example, F. Reizman and W. van Gelder, *Solid State Electronics*, Vol. 10, p. 625 (1967).

While the above thickness measurement technique has been found to be useful in many instances, difficulties arise when measuring the thickness of a relatively thin, transparent (to the incident visible light) region formed on, e.g., deposited onto, a relatively thick, transparent region. Typically, the thickness of the relatively thick region is first measured. Then, the relatively thin region is formed on the thick region and the combined thickness of the two transparent regions is measured. Finally, the thickness of the relatively thick region is subtracted from the combined thickness to determine the thickness of the relatively thin region. However, if the measured thickness of the relatively thick transparent region is in error even by a relatively small amount, a substantial error in the measured thickness of the relatively thin region often occurs. As a consequence, the relatively thin region often suffers undesirable underetching or overetching.

Thus, more accurate etch monitoring and thickness measurement techniques continue to be sought.

SUMMARY OF THE INVENTION

The invention involves etch monitoring and thickness measurement techniques which yield more accurate results than were achievable with previously used techniques. In accordance with the invention, the etching of a substrate region is monitored, or the thickness of the region is measured, by directing light onto the region and detecting the intensity of the reflected light. However, in contrast to previous techniques, the incident light is chosen so that a substrate region (or regions) underlying, and/or a patterned substrate region (or regions) overlying the substrate region of interest, is substantially opaque to the incident light. The presence of the opaque region precludes transmission through the opaque region of reflections of refracted incident light from underlying surfaces or regions, and thus precludes the formation of unwanted interference signals. Consequently, etch depth, or thickness, is more accurately determined.

A variety of substrate regions are substantially opaque to nonvisible electromagnetic radiation, e.g., ultraviolet light. Thus, in one embodiment of the invention, a substrate region which is, for example, to be incorporated into a device, is made substantially opaque to the incident light by using nonvisible incident light. In other embodiments of the invention involving a substrate region which is, for example, a sacrificial coating, the substrate region is made substantially opaque to the incident light by using, for example, nonvisible incident light. Alternatively, the desired opacity of the sacrificial substrate region is achieved by incorporating a light-absorbing material which does not absorb the light used for alignment purposes, into the substate region and using as incident light the nonvisible or visible light (whose wavelength or wavelength range is different from that used for alignment purposes) absorbed by the light-absorbing material. Thus, improved accuracy is achieved while maintaining compatibility with the alignment procedure.

BRIEF DESCRIPTION OF THE DRAWING

The invention is described with reference to the accompanying drawings, wherein.

DETAILED DESCRIPTION

Figure 1:
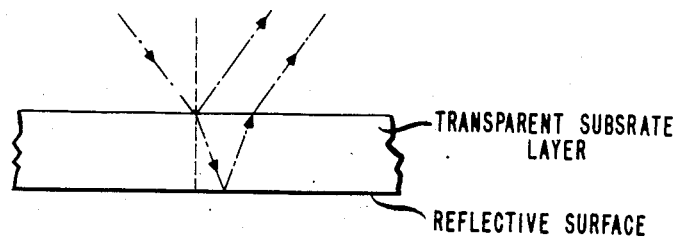
FIG. 1 depicts a technique for monitoring etching.

The invention involves a method and apparatus for fabricating devices, the method including the step of monitoring the etching, or measuring the thickness, of a substrate region. The invention also involves the devices fabricated in accordance with the inventive method.

The etch monitoring and thickness measurement techniques employed in the inventive device fabrication method are generally similar to the previously used techniques in that they involve shining light onto a portion, or all, of a substrate region of interest, and detecting the intensity of all or a portion of the reflected light. However, the former techniques are distinguished from the latter techniques in that the incident light is chosen so that a substrate region (or regions) underlying, and/or a patterned substrate region (or regions)

overlying, the substrate region of interest is substantially opaque to at least a portion of the incident light. (For purposes of the invention, an overlying patterned substrate region is one which overlies only a portion or portions, but less than all, of the substrate region of interest. Such a patterned region is formed, for example, by removing selected portions of a substrate region which overlies all of the substrate region of interest, or by a selective deposition of overlying substrate region material onto the substate region of interest or an intervening substrate region.) Generally, the incident light is also chosen so that the substrate region of interest is substantially transparent to at least a portion of the incident light. For purposes of the invention, a substrate region is a material region of a substrate which is either incorporated into the device undergoing fabrication, or removed during the device fabrication process. In addition, a substrate region is substantially opaque to any portion of the light incident on the region provided less than about 5 percent of that incident portion is transmitted through the region. On the other hand, a substrate region is substantially transparent to any portion of the light incident on the region provided more than about 5 percent of that incident portion is transmitted through the region.

The purpose of a substantially opaque substrate region underlying a substrate region of interest, e.g., a substrate region whose etching is being monitored or whose thickness is being measured, is to prevent the transmission (through the opaque region) of light reflected from surfaces and structures underlying the opaque region. On the other hand, the purpose of a substantially opaque, patterned substrate region overlying a substrate region of interest, e.g, a substantially opaque, patterned resist layer overlying a substrate layer whose etching is being monitored, is to prevent the transmission (through the opaque region) of light reflected from the interface between the opaque region and an underlying region, e.g., the region of interest. Consequently, undesirable signals not associated with the etching or thickness of the substrate region of interest are largely, or entirely, eliminated. Thus, the accuracy in the determination of etch depth, or the thickness, of the substrate region of interest is significantly improved.

The presence of a substantially opaque substrate region underlying a substrate region of interest is advantageous for reasons other than the avoidance of undesirable interference signals. For example, when monitoring the etching of a substantially transparent substrate region, the presence of a substantially opaque substrate region immediately beneath the substrate region undergoing etching has the unexpected advantage that the etch end point (which corresponds to a change in the frequency of the intensity oscillations in the intensity-time curve) always occurs at a relative maximum or a relative minimum in the intensity-time curve. Thus, etch end point is more readily anticipated, which permits greater accuracy in the determination of etch end point than was previously possible.

The choice of the incident light is determined by the wavelength (or wavelengths) of light absorbed by the substrate region overlying or underlying the substrate region of interest and, if so desired, transmitted by the substrate region of interest. For example, if the overlying or underlying region inherently absorbs more than about 5 percent of the light (to achieve substantial opacity) of a particular wavelength (or wavelengths), then the inherently absorbed light is used as the incident light (provided the substrate region of interest is substantially transparent to this incident light, if so desired). Generally, a useful wavelength of light (one inherently absorbed by the underlying or overlying substrate region and, if so desired, transmitted by the substrate region of interest) is found by forming, e.g., depositing, the substrate region of interest and the underlying or overlying substrate region on separate substrates of known transmissivity to a particular wavelength of light. The two regions are then impinged with light of this particular wavelength, and the amount of light transmitted by the substrates is measured. In this regard, a wide variety of substrate materials are either substantially transparent or substantially opaque to nonvisible light, e.g., ultraviolet (UV) light (light having a wavelength ranging from about 150 nm to about 400 nm). For example, silicon dioxide is substantially transparent to UV light, while organic polymer resists (such as the resist sold under the trade name HPR-204 by the Hunt Chemical Company of Palisades Park, N.J. which have been subjected to a heat treatment at a temperature greater than about 210 degrees C., are substantially opaque to UV light.

The use of UV light, rather than visible light, for monitoring the etching of a substrate region also has direct consequences (other than the avoidance of undesirable interference signals) for the determination of etch end point. That is, when monitoring the etch depth of a substrate region undergoing etching, the spacing between two adjacent minima or two adjacent maxima in the recorded intensity-time curve corresponds to a change in etch depth proportional to the wavelength of the incident light. By using UV incident light, rather than visible incident light, the number of extrema in the intensity-time curve corresponding to a given etch depth change is increased (because the wavelength of UV light is less than that of visible light). Consequently, etch depth is more accurately monitored.

If the overlying or underlying substrate region does not inherently absorb more than about 5 percent of the light of any wavelength, or if it is desired to use incident light other than the inherently absorbed light, then a light-absorbing material (which does not absorb the wavelength used for alignment) is added to the region, provided this has no significant adverse impact on device operation. The incident light is then chosen to be the light absorbed by the light-absorbing material (provided the substrate region of interest is substantially transparent to this light, if this is desired). A light-absorbing material, is for example, a dye, e.g., a dye sold by the Pylan Packer Company of Garden city, N.Y. under the trade name Morton Automate Blue 8, which absorbs light of wavelength equal to 632.8 nm.

It is convenient to differentiate those substantially opaque substrate regions which are ultimately incorporated into a device from those substantially opaque substrate regions which serve as sacrificial coatings removed during device fabrication. In the case of an underlying substrate region which is to be substantially opaque and which is to be incorporated into a device, the desired opacity is generally not achieved through the incorporation of light-absorbing material because this is usually difficult and often has adverse consequences for device operation. Rather, opacity is generally achieved by choosing light of a particular wave length or wavelength range to which the underlying substrate region is (inherently) substantially opaque and, if desired, the substrate region of interest is substantially transparent. Generally, the useful wavelengths are from the nonvisible, e.g., UV, wavelength range.

The incorporation of light-absorbing material into an underlying substrate region which serves as a sacrificial coating removed during device fabrication, generally has no adverse consequences for device operation. Thus, the desired opacity of such a region is achieved either by using the above procedure or by incorporating light-absorbing material into the underlying substrate region and choosing incident light which is absorbed by this material. For example, if the underlying substrate region is a sacrificial coating such as an organic polymer resist formed by conventional spin-deposition techniques, then a light-absorbing material is readily incorporated into the organic resist by dissolving the material in the resist solution (commercial organic resists are typically supplied in solution form). During spinning, the resist solvent evaporates leaving an organic resist material containing light-absorbing material. The incident light is then chosen to be the visible or nonvisible light which is absorbed by the light-absorbing material.

Generally, when the underlying substrate region is a sacrificial coating, the substrate region of interest, i.e., the overlying substrate region, is also a sacrificial coating because removal of the underlying region usually requires removal of the overlying region. Typically, the underlying and overlying substrate regions are material regions which serve as metallization or etch masks or regions of resist material of different composition.

In the case of an overlying, patterned substrate region which is incorporated into a device, light-absorbing material is generally avoided for the reasons given above. The desired opacity is usually achieved by using nonvisible, e.g., UV, incident light.

For an overlying, patterned substrate region which serves as a sacrificial coating, the incorporation of light-absorbing material generally has no adverse consequences for device operation. Thus, opacity is achieved by using incident visible or nonvisible light absorbed by the material. Alternatively, there is no incorporation of light-absorbing material, and the incident light is usually nonvisible, e.g., UV, light, for the reason given above. A sacrificial, overlying, patterned substrate region is, for example, a patterned etch mask which is substantially free of metallic atoms in their zero oxidation state, e.g., a patterned, organic polymer resist. For purposes of the invention, a material is substantially free of metallic atoms in their zero oxidation state provided it contains less than about 25 percent atomic concentration of metallic atoms in their zero oxidation state.

As a pedagogic aid to a more complete understanding of the invention, the application of the inventive etch monitoring technique to the etching of the silicon dioxide layer of the tri-level resist (regarding the tri-level resist see, for example, J. M. Moran and D. Maydan, *Bell System Technical Journal*, Vol. 58, pp. 1027–1038, (1979)), is described below.

Figure 2:
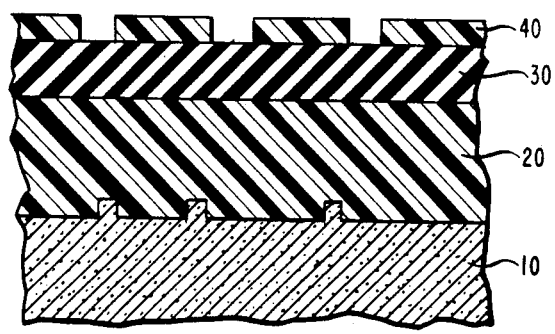
FIG. 2 depicts, in cross section, the trilevel resist.

The tri-level resist is generally (but not exclusively) used to etch very fine-line features (features having dimensions typically smaller than about 2 $\mu$m) into substrate layers having nonplanar, e.g., stepped, surfaces. As shown in FIG. 2, the tri-level resist includes a relatively thick layer 20 which covers, and planarizes, the nonplanar surface 10 of the substrate layer to be patterned. (The layer 20 planarizes the nonplanar surface 10 in the sense that the layer 20 covers the steps in the surface 10 and presents an essentially flat upper surface.) Typically, the layer 20 consists of an organic polymer such as HPR-204 resist which is deposited by conventional spindeposition techniques onto the nonplanar surface 10 (and subsequently baked). The thickness of the planarizing layer 20 ranges from about 0.5 $\mu$m to about 3 $\mu$m. A thickness less than about 0.5 $\mu$m is undesirable because such thin layers often have an undesirably large number of pinholes. A thickness greater than about 3 $\mu$m is undesirable because such thick layers require an undesirably long etch time, and often lead to a loss of linewidth control.

The tri-level resist typically includes a silicon dioxide layer 30 which overlies the planarizing layer 20. The layer 30 is deposited, for example, by conventional plasma deposition techniques. The thickness of the layer 30 ranges from about 0.08 $\mu$m to about 0.4 $\mu$m. Thicknesses less than about 0.08 $\mu$m or greater than about 0.4 $\mu$m are undesirable for the reasons given above.

A relatively thin layer 40 of resist, e.g., photoresist or e-beam resist or X-ray resist (depending upon the nature of the exposing energy), in turn covers the silicon dioxide layer 30. The layer 40 consists of, for example, the photoresist sold under the trade name AZ-2415 by the American Hoechst Corporation of Somerville, N.J., or the e-beam resist sold under the trade name PBS by Mead Technologies, Incorporated of Rolla, Mo., or DCOPA X-ray resist sold by the Great Lakes Chemical Company of West Lafayette, Ind. Generally, the layer 40 is deposited onto the layer 30 by conventional spin-deposition techniques and has a thickness ranging from about 0.3 $\mu$m to about 1.5 $\mu$m. A thickness less than about 0.3 $\mu$m is undesirable because such thin layers often have an undesirably large number of pinholes, while a thickness greater than about 1.5 $\mu$m is undesirable because it is difficult to resolve relatively small features (smaller than about 2 $\mu$m) with such thick layers.

In the course of etching a pattern into the nonplanar substrate layer, the pattern is first defined in the layer 40 by selectively exposing the layer 40 to actinic radiation (e.g., electromagnetic radiation or electron beams or x-rays) and developing the layer 40. Then, using the patterned layer 40 as an etch mask, the pattern is transferred into the layer 30 by etching the layer 30 in, for example, a CHF$_3$ plasma. Thereafter, the pattern defined in the layer 30 is transferred into the layer 20 by etching the layer 20 in, for example, an O$_2$ plasma while using the layer 30 as an etch mask. Finally, the desired pattern is transferred into the nonplanar substrate layer by etching this layer while using the patterned layer 20 as an etch mask.

An important consideration in the above etching procedure is the need to avoid overetching of the silicon dioxide layer 30. Such overetching often results in degradation of the patterned resist layer 40, which in turn results in a loss of linewidth control and an increased possibility of defects, e.g., pinholes, during the etching of the layer 30 and, ultimately, similar consequences during etching of the nonplanar substrate layer. Attempts to monitor the etching of the layer 30 using conventional techniques (shining visible light on a bare portion of layer 30 or a portion covered by the patterned resist layer 40) have been thwarted by the transparency to visible light of layer 20. That is, the interference signal associated with the etching of the layer 30 is generally overwhelmed by a signal produced by refracted incident light reflected from structures in the nonplanar surface 10 and transmitted (upwardly, as viewed in FIG. 2) through the layer 20. But the etch monitoring of the layer 30 is readily and accurately achieved, in accordance with the invention, by, for example, using UV incident light to which the silicon dioxide layer 30 is substantially transparent and to which the HPR-204 layer 20 is substantially opaque. Alternatively, the Morton Automate Blue 8 dye, which absorbs visible light of wavelength equal to 632.8 nm, is incorporated into the layer 20 (as described above), and 632.8 nm wavelength light is used as the incident light during etch monitoring. The dye concentration (by volume) in the resist solution ranges from about 4 percent to about 10 percent. Concentrations less than about 4 percent are undesirable because they lead to opaque layers whose opacity is undesirably low. Concentrations greater than about 10 percent are undesirable because they often lead to opaque layers which exhibit undesirably low adhesion to the silicon dioxide layer 30 and the underlying substrate.

Subsequent to the etching of the silicon dioxide layer 30, the etching of the HPR-204 layer 20 is then readily monitored using, for example, incident visible light, because the layer 20 is substantially transparent to such incident light (provided any light-absorbing material incorporated into the layer 20 does not absorb the visible light). Moreover, the underlying substrate, if it is, for example, of silicon, will be substantially opaque to the incident visible light.

One aspect of the invention, i.e., the inventive etch monitoring technique, is applicable, in general, to all etching techniques including, but not limited to, plasma and wet chemical etching, reactive sputter etching (also called reactive ion etching) and ion milling. In addition, the inventive method is also applicable to those techniques where a directed beam of energy or a directed beam of charged particles is used to directly pattern a substrate region, without the use of an etch mask.

The invention encompasses the application of the inventive etch monitoring and thickness measurement techniques to the fabrication of devices. That is, in accordance with the invention, a device such as an electronic information processing device is fabricated by a series of steps, well known in the art, which, for example, includes the step of etching a pattern just through the thickness of a substrate region. Alternatively, a substrate region is formed which is not to be etched and which is to have a desired thickness. In the former case, the etching of the substrate region is monitored, or its thickness is measured (if the etch rate is known), using the inventive etch monitoring technique or the inventive thickness measurement technique to achieve the desired etch depth. In the latter case, the thickness of the substrate region is measured using the inventive thickness measurement technique, and adjusted until the desired thickness is achieved. Once the desired etch depth or the desired thickness has been achieved, the device is completed by a series of conventional steps.

The invention also encompasses apparatus for implementing the inventive etch monitoring and thickness measurement techniques. In general, such apparatus includes a source of nonvisible, e.g., UV, light for illuminating a substrate region, as well as an optical detector and recorder for detecting and recording the intensity of the nonvisible light reflected from the region.

Figure 3:
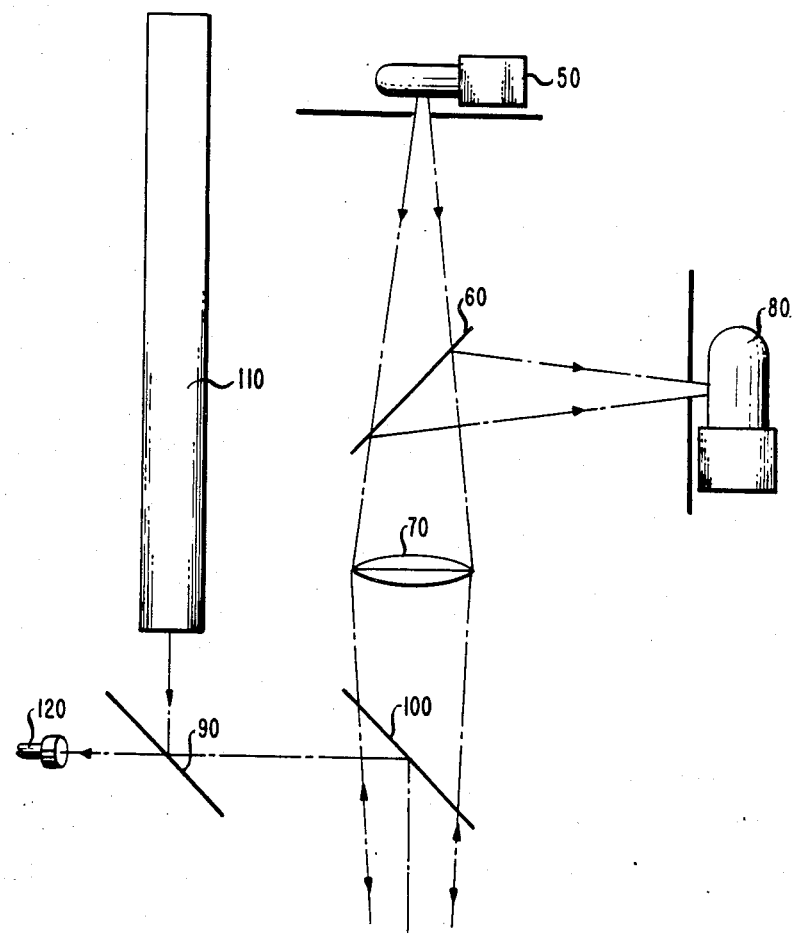
FIG. 3 schematically depicts an embodiment of the inventive apparatus, as well as conventional apparatus, for monitoring etching and measuring thickness.

One embodiment of apparatus for monitoring the etching, or for measuring the thickness, of a substrate region is schematically depicted in FIG. 3 (which also depicts apparatus not encompassed by the invention). This apparatus includes a source 50 of nonvisible, for example, UV, light, e.g., a mercury arc lamp, as well as a beam splitter 60 which is partially transparent to and partially reflective of, e.g., about 50 percent transparent to and about 50 percent reflective of, the light emitted by the source 50. The apparatus also includes a lens 70 as well as a photodetector 80. In operation, the light emitted by the source 50 is partially transmitted by the beam splitter 60 to the lens 70, which focuses the transmitted light onto the substrate region (or, if the region is within a plasma or wet chemical reactor, onto an optical window of the reactor through which the light impinges the region). Reflected light from the substrate region is then transmitted through the lens 70 to the beam splitter 60, where a portion of this light is reflected onto the detector 80.

The invention further encompasses wet chemical etching machines and dry etching machines, e.g., plasma etching machines, reactive ion etching machines, and ion milling machines, which include wet or dry etching reactors in combination with the inventive etch monitoring and thickness measurement apparatus, described above. Such etching machines enable one to etch substrates to a more accurate etch depth than was previously possible.

EXAMPLE 1

Both the inventive etch monitoring technique (using, in this instance, UV light) and the conventional etch monitoring technique (using visible light) were used to monitor the etch depth of a substrate which underwent reactive ion etching. The substrate included a 3-inch silicon wafer whose flat upper surface was covered by successive layers of HPR-204 resist and silicon dioxide. The resist was deposited by conventional spin-deposition techniques and was baked at 210 degrees Centigrade for about two hours. The thickness of the resist, as measured by a Nanospec spectral photometer, was about 1.8 $\mu$m. The layer of silicon dioxide was deposited using conventional plasma-assisted chemical vapor deposition techniques, and had a thickness (as determined from the etch monitoring data) of about 0.14 $\mu$m.

The apparatus used to reactive ion etch the substrate included a stainless steel, cylindrical reactor chamber which was 24 inches high and 19 inches in diameter. Centrally arranged within the reactor chamber was a cylindrical electrode which was 14 inches high and hexagonal in cross section. Opposed, parallel sides of the hexagonal electrode were spaced apart by about 6 inches.

The substrate was mounted on a side of the haxagon-shaped electrode, and reactive ion etched in a $CHF_3$ atmosphere for about 10 minutes. During the etching procedure the walls of the reactor chamber were grounded, a 13.56 MHz rf signal was applied to the hexagon-shaped electrode, $CHF_3$ was flowed into the reactor chamber at 35 ml/min, and the pressure within the reactor chamber was maintained at 10 millitorr. The dc bias voltage between the walls of the reactor chamber and the hexagon-shaped electrode was 410 volts, and the power density was 0.07 watts/$cm^2$.

During the etching procedure, the etch depth was monitored by shining both UV light (light of wavelength equal to 253.7 nm) and visible light (light of wavelength equal to 632.8 nm) at normal incidence onto the substrate through an optical window of the reactor chamber, and detecting and recording the reflected light. The apparatus involved in etch monitoring, which is schematically depicted in FIG. 3, included a source of UV light 50, i.e., a low pressure mercury arc lamp, Model 11SC-2 sold by the Spectronics Corporation of Westbury, N.Y., which has a strong, narrow emission line at 253.7 nm. The apparatus also included a beam splitter 60 which consisted of a dielectric film formed on a fused silica substrate. The beam splitter 60, which was oriented at 45 degrees to the light rays emanating from the source 50, was designed to reflect 50 percent, and transmit 50 percent, of any 253.7 nm light incident at an angle of 45 degrees. The UV light transmitted by the beam splitter 60 impinged a fused silica lens 70 which focused this light, through a beam splitter 100 (which was designed to have a high transmittance to 253.7 nm light), onto the substrate through the optical window in the reactor chamber. The UV light reflected from the substrate was transmitted through the beam splitter 100 and lens 70 to the beam splitter 60, where a portion of this light was reflected onto a UV photodetector 80, which consisted of a Model R-166 photomultiplier tube sold by the Hamamatsu Corporation of Middlesex, N.J. This detector was sensitive only to wavelengths shorter than about 300 nm.

The etch monitoring apparatus also included a He-Ne laser 110, Model No. 1103P purchased from the Uniphase Corporation of Mountain View, Calif., which emitted light of wavelength equal to 632.8 nm. This light successively impinged beam splitters 90 and 100, each oriented perpendicularly to beam splitter 60 and at 45 degrees to the light emanating from the laser 110. The beam splitters 90 and 100 served to transmit (through reflections) a portion of the light emitted by the laser 100 to the substrate through the optical window in the reactor chamber. The beam splitters 90 and 100 also transmitted (through reflections) a portion of the laser light reflected by the substrate to a photodetector 120. The beam splitter 90 was a pellicle beam splitter, Model No. 3743 purchased from the Oriel Corporation of Stratford, Conn., which was designed to transmit 50 percent, and reflect 50 percent, of 632.8 nm light incident at an angle of 45 degrees. Beam splitter 100, on the other hand, was a dielectric film formed on a fused-silica substrate, designed to substantially transmit all 253.7 nm light, and reflect 90 percent of 632.8 nm light incident at an angle of 45 degrees. The photodetector 120 was a PIN-5DP detector sold by the United Detector Technology Corporation of Culver City. Calif.

Figure 4:
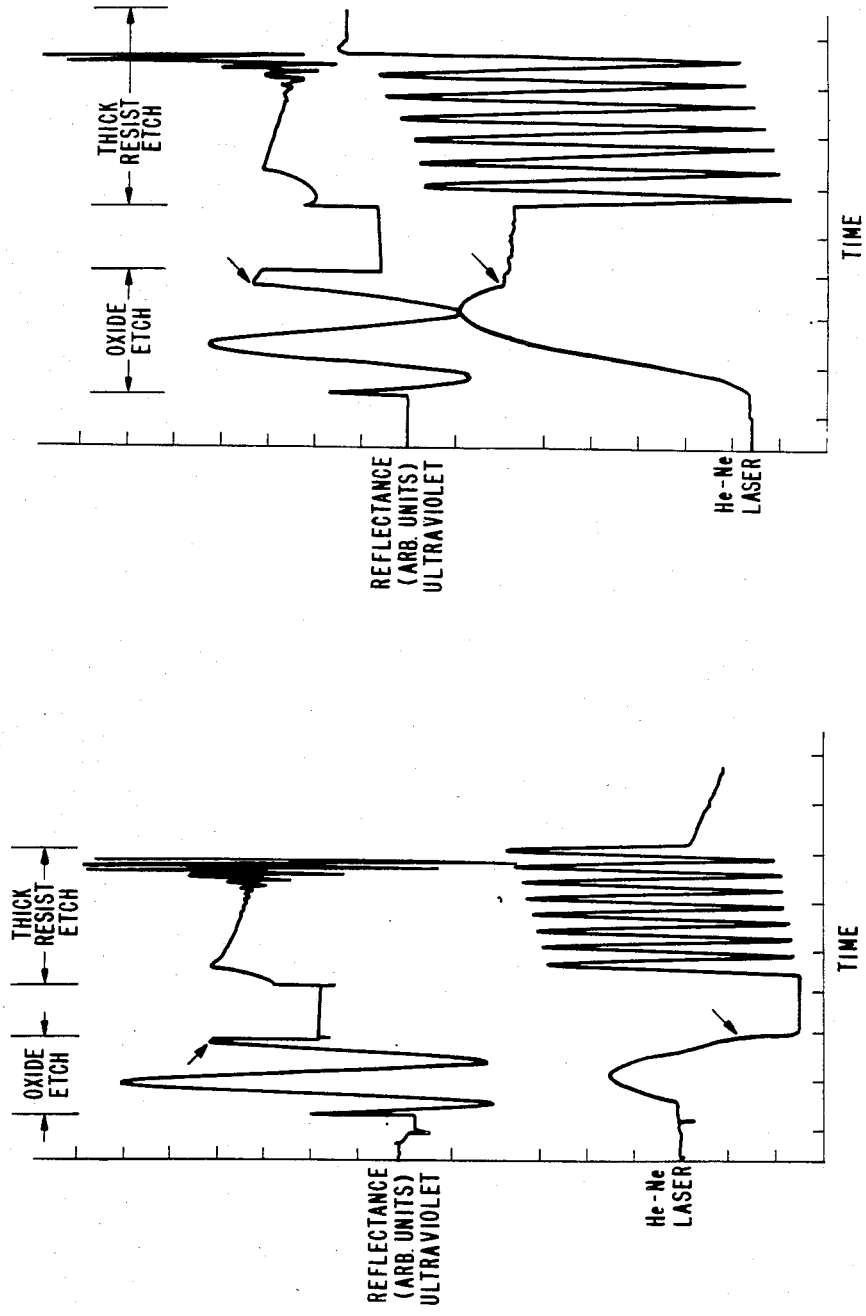

The intensity of the reflected UV light, as detected by the UV detector 80, was recorded as a function of time by a strip chart recorder, and is displayed in FIG. 4. The intensity of the reflected visible light, as detected by the detector 120, is displayed in the same figure. The portions of the two intensity-time curves corresponding to the etching of the silicon dioxide layer and the etching of the resist layer, have been labeled. As is evident, the UV intensity-time curve corresponding to the silicon dioxide etching includes about 1¾ intensity oscillations, and the etch end point (as denoted by an arrow in FIG. 4) occurs at an intensity maximum. (The overall drop in the intensity of the reflected UV light is believed to be caused by the buildup during etching of a UV light-absorbing polymer on the optical window of the reactive ion etching chamber.) On the other hand, the visible intensity-time curve corresponding to the silicon dioxide etching only involves about 3/5 of an intensity oscillation, and the position of the etch end point (also denoted by an arrow in FIG. 4) is not at an intensity maximum.

EXAMPLE 2

The apparatus described in Example 1 was also used to etch, and to monitor the etch depth, of a substrate which included a 3-inch silicon wafer whose upper surface supported a first, patterned layer of silicon dioxide, a layer of HPR-204 resist, and a second layer of silicon dioxide. The first silicon dioxide layer, which was grown by conventional thermal oxidation techniques, had a thickness of about 0.35 $\mu$m, as measured by a Nanospec spectral photometer. The pattern in this first silicon dioxide layer, which consisted of 5 $\mu$m lines and spaces, was formed by conventional lithographic and etching techniques. The thicknesses of the HPR-204 resist and the second silicon dioxide layer were the same as those in Example 1.

Figure 5:
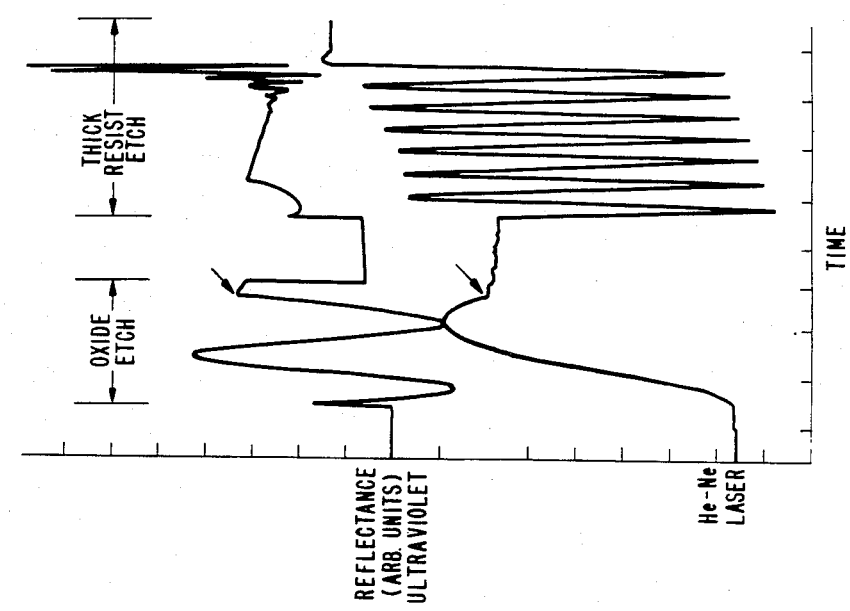

The intensity-time curves produced by UV and visible light incident on the sample are depicted in FIG. 5. As is evident, the UV intensity-time curve is essentially identical to that in FIG. 4. This shows that the UV reflectance technique is essentially insensitive to the presence of underlying structures or surfaces, e.g., the nonplanar surface associated with the patterned silicon dioxide layer.

EXAMPLE 3

The apparatus described in Example 1 was again used to etch, and to monitor the etching, of a layer of silicon dioxide covered by a patterned layer of HPR-204 resist, the resist and silicon dioxide layers overlying a 3-inch silicon wafer. The silicon dioxide layer, which was grown using conventional thermal oxidation techniques, had a thickness of about 1.8 $\mu$m, as measured by the Nanospec spectral photometer. The HPR-204 resist, which had been spin-deposited and baked as described above, had a thickness of about 1.6 $\mu$m, as also measured by the Nanospec spectral photometer. The pattern in the resist, which had been formed using the tri-level resist process, consisted of an array of circular openings, each having a diameter of about ¾$\mu$m, with the center-to-center spacing between adjacent openings being about 1⅜$\mu$m.

Figure 6:
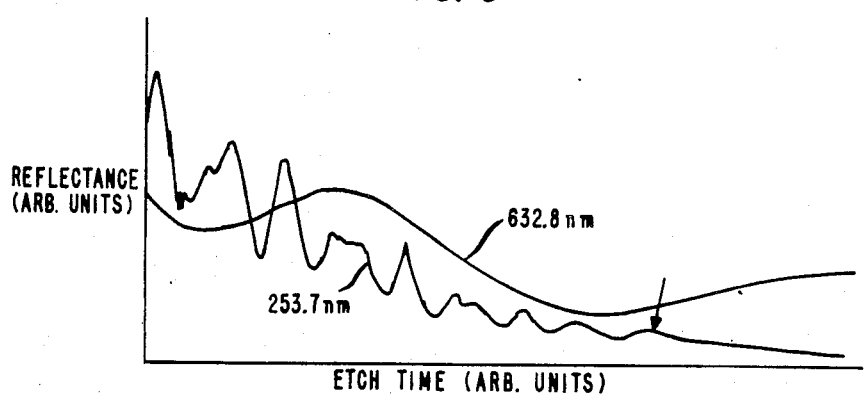
FIGS. 4-6 depict intensity-time curves obtained during the etching of a substrate using both the inventive and conventional etch monitoring techniques.

The intensity-time curves resulting from the use of both UV incident light and visible incident light are displayed in FIG. 6. The visible intensity-time curve has slightly more than one intensity oscillation, which is believed to be due almost entirely to the (relatively slow) erosion of the HPR-204 resist. On the other hand, the UV intensity-time curve includes many intensity oscillations due almost entirely to etching of the silicon dioxide layer. As before, the etch end point (denoted by an arrow in FIG. 6) of the silicon dioxide layer occurs at an intensity maximum.

EXAMPLE 4

Figure 7:
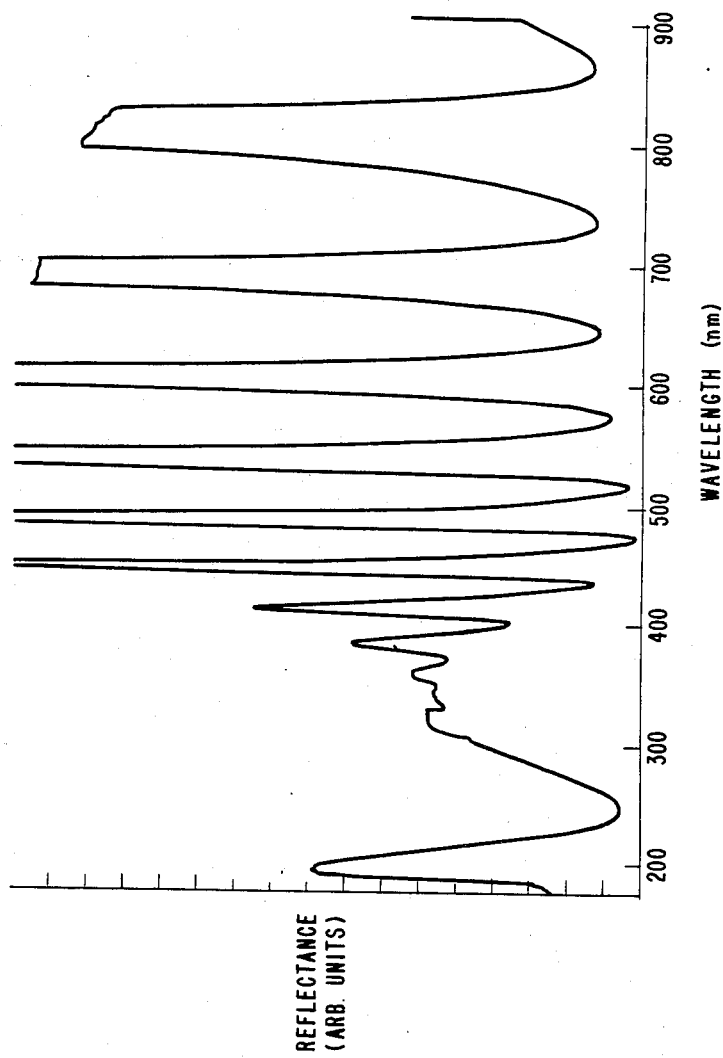
FIG. 7 depicts an intensity-wavelength curve obtained using both the inventive and conventional thickness measurement techniques.

The thickness of a layer of plasma-deposited silicon dioxide, overlying a layer of HPR-204 resist (supported by a 3-inch silicon wafer), was measured by shining light of wavelength ranging from about 190 nm to about 900 nm onto the silicon dioxide layer, and measuring the intensity of the reflected light as a function of wavelength. The light source and the photodetector were included in a dual beam spectrophotometer, Model 575, purchased from the Perkin-Elmer Corporation of Norwalk, Conn. In operation, light emitted by the spectrophotometer impinges both the test sample as well as a reference sample (in this case a 3-inch silicon wafer covered by a layer of HPR-204 resist), and the spectrophotometer measures the ration of the intensities of the light reflected from both samples. The resulting normalized intensities, as a function of wavelength, are depicted in FIG. 7. For the UV portion of the wavelength range used here, i.e., for wavelengths ranging from about 190 to about 400 nm, the structure of the intensity-wavelength curve is relatively simple. That is, the curve contains relatively few intensity maxima and minima. This is due to the fact that at UV wavelengths, the HPR-204 resist is substantially opaque, and the detected maxima and minimum are determined almost entirely by the thickness of the silicon dioxide layer which is substantially transparent at these wavelengths. On the other hand, at wavelengths beyond the UV range, i.e., for wavelengths longer than 400 nm, the intensity-wavelength curve is relatively complicated. It is believed that this is due to the fact that the HPR-204 resist is no longer opaque, and produces intensities which change rapidly with wavelength.

By using an index of refraction for the silicon dioxide of 1.56, and the first intensity minimum and the first and second intensity maxima contained within the UV wavelength range, the thickness of the silicon dioxide layer was calculated (using the technique described in F. Reizman and W. van Gelder, *Solid State Electronics*, supra, p. 625) to be 0.1193 $\mu$m. On the basis of the known plasma deposition rate and deposition time, the silicon dioxide layer was known to be about 0.12 $\mu$m thick.

What is claimed is:

1. A method for fabricating a device, comprising the steps of:
   etching at least a portion of a first region of a substrate, which first region overlies a second region of said substrate;
   monitoring said etching by illuminating an area of said first region being etched with light and detecting the intensity of at least a portion of the light reflected from said first region;
   terminating said etching based on the detected intensity; and
   completing the fabrication of said device,
   Characterized In That
   said illuminating light includes nonvisible light which is chosen in relation to said first and second regions so that said first region is substantially transparent, and said second region is substantially opaque, to said nonvisible light.

2. The method of claim 1 wherein said first region is removed subsequent to said terminating step.

3. The method of claim 1 wherein said second region is removed subsequent to said terminating step.

4. A method for fabricating a device, comprising the steps of:
   forming a sacrificial coating overlying a substrate, said coating including a first region overlying a second region;
   etching at least a portion of said first region;
   monitoring said etching by illuminating an area of said first region being etched with light and detecting the intensity of at least a portion of the light reflected from said first region;
   terminating said etching based on the detected intensity; and
   completing the fabrication of said device, said completing step including the step of removing said sacrificial coating,
   Characterized In That
   said illuminating light is chosen in relation to said first and second regions so that said first region is substantially transparent, and said second region is substantially opaque, to at least a portion of the illuminating light.

5. A method for fabricating a device, comprising the steps of:
   measuring a thickness of a first region of a substrate overlying a second region of said substrate by illuminating an area of said first region with light and detecting the intensity of at least a portion of the light reflected from said first region; and
   completing the fabrication of said device,
   Characterized In That
   said illuminating light includes nonvisible light which is chosen in relation to said first and second regions so that said first region is substantially transparent, and said second region is substantially opaque, to said nonvisible light.

6. The method of claim 5 wherein said completing step includes the step of etching at least a portion of said first region, the etching time being determined, in part, by the measured thickness of said first region.

7. The method of claim 6 wherein said completing step further includes the step of removing said first region subsequent to said etching step.

8. The method of claim 7 wherein said completing step still further includes the step of removing said second region.

9. The method of claim 5 wherein said completing step includes the step of altering a thickness of said first region in response to the measured thickness.

10. A method for fabricating a device, comprising the steps of:
    forming a sacrificial coating overlying a substrate, said coating including a first region overlying a second region;
    measuring a thickness of said first region by illuminating an area of said first region with light and detecting the intensity of at least a portion of the light reflected from said first region;
    etching at least a portion of said first region, the etching time being determined, in part, by the measured thickness of said first region; and
    completing the fabrication of said device, said completing step including the step of removing said sacrificial coating,
    Characterized In That
    said illuminating light is chosen in relation to said first and second regions so that said first region is substantially transparent, and said second region is substantially opaque, to at least a portion of the illuminating light.

11. A method for fabricating a device, comprising the steps of:
    forming a patterned first region of a substrate, which first region overlies a second region of said substrate;
    etching said second region while using said patterned first region as an etch mask;
    monitoring the etching of said second region by illuminating at least a portion of said second region being etched with light, and detecting the intensity of at least a portion of the light reflected from said second region;
    terminating said etching based on the detected intensity; and
    completing the fabrication of said device, Characterized In That
    said illuminating light includes nonvisible light which is chosen in relation to said first region so that said first region is substantially opaque to said nonvisible light.

12. The method of claim 11 wherein said completing step includes the step of removing said first region.

13. A method of fabricating a device, comprising the steps of:
    forming a patterned sacrificial coating overlying a substrate, said coating including a material substantially free of metallic atoms in their zero oxidation state;
    etching said substrate while using said patterned coating as an etch mask;
    monitoring said etching by illuminating at least a portion of the substrate being etched with light, and detecting the intensity of at least a portion of the light reflected from the substrate;
    terminating said etching based on the detected intensity; and
    completing the fabrication of said device, said completing step including the step of removing said patterned sacrificial coating,
Characterized In That
    said illuminating light is chosen in relation to said sacrificial coating so that said coating is substantially opaque to at least a portion of the illuminating light.

14. An etching machine, comprising:
    an etching reactor;
    first means for illuminating a substrate within said reactor with light;
    second means for sensing at least a portion of the light reflected from said substrate,
Characterized In That
    at least a portion of the illuminating light is nonvisible light.

15. The etching machine of claim 14 wherein said nonvisible light is UV light.

* * * * *

UNITED STATES PATENT AND TRADEMARK OFFICE
CERTIFICATE OF CORRECTION

PATENT NO. : 4,680,084

DATED : July 14, 1987

INVENTOR(S) : Peter A. Heimann, Joseph M. Moran and Ronald J. Schutz

It is certified that error appears in the above-identified patent and that said Letters Patent is hereby corrected as shown below:

Column 6, line 51, "city" should read --City--.
Column 9, line 18, after "substrate" insert
--, and are relatively poor etch masks,
i.e., are readily degraded during etching
of the underlying substrate--.

Signed and Sealed this

Twelfth Day of December, 1989

Attest:

JEFFREY M. SAMUELS

*Attesting Officer*     *Acting Commissioner of Patents and Trademarks*